United States Patent Office 3,366,694
Patented Jan. 30, 1968

3,366,694
BROMINATION OF 3-CHLORODIPHENYL ETHER
Quentin E. Thompson, Belleville, Ill., assignor to Monsanto Company, St. Louis, Mo., a corporation of Delaware
No Drawing. Filed Oct. 12, 1964, Ser. No. 403,390
1 Claim. (Cl. 260—612)

ABSTRACT OF THE DISCLOSURE

A mixture of isomeric bromine- and chlorine-containing diphenyl ethers obtained by the bromination of 3-chlorodiphenyl ether with bromine in the presence of a Friedel-Crafts catalyst.

---

This invention relates to a process for the bromination of 3-chlorodiphenyl ether to produce 4-bromo-3'-chlorodiphenyl ether.

Because of its good balance of physical properties, especially its outstanding fire-resistance, 4-bromo-3'-chlorodiphenyl ether is useful as a functional fluid in various applications, such as an electronic coolant, a diffusion pump fluid and as a hydraulic fluid.

4-bromo-3'-chlorodiphenyl ether can be prepared by the Ullmann reaction between a bromine- and/or chlorine-containing benzene and a halogen-substituted alkali metal phenolate. The Ullmann procedure is complicated, however, by difficulties in separating the desired product from halogenated benzene, which is normally used in excess.

It has now been found that 4-bromo-3'-chlorodiphenyl ether can be prepared in high yields by a process which avoids the difficulties associated with the Ullmann procedure. Specifically, the process of this invention involves the direct bromination of 3-chlorodiphenyl ether, preferably in the presence of a suitable catalyst.

The process of the invention is illustrated by the following specific example in which parts are parts by weight.

EXAMPLE

Into a suitable reaction vessel fitted with an agitator, a reflux condenser and heating and cooling means, there is charged 610 parts of 3-chlorodiphenyl ether and 2 parts of powdered iron. The resulting mixture is heated to about 65° C. followed by the slow addition of 320 parts of liquid bromine. During the addition of bromine the reaction mass is maintained at 60–80° C. After completing the addition of bromine the reaction mass is slowly heated to about 135° C. and then held at that temperature for four hours. The pressure in the reaction system is then lowered to about 100–200 mm. of Hg and maintained for about 30 minutes in order to remove as much residual hydrogen bromine as possible. After cooling the reaction mixture to about 70° C., 10 parts of calcium oxide is charged and the resulting mixture is fractionated to give a main fraction containing 4-bromo-3'-chlorodiphenyl ether and a small amount of the other isomers such as the 3,3'-isomer. The product is a colorless liquid having an index of refraction, $n_D^{25}$ of 1.6128, a specific gravity of 1.485 and a boiling range of 148–158° C. at 1.0 mm. of Hg.

For many of the uses for 4-bromo-3'-chlorodiphenyl ether the product prepared by the method of this invention, which usually contains minor amounts of the other position isomers of said ether, can be used. In many instances in fact, the mixture of isomeric products is preferred not only because of its lower cost but also because the properties of such mixture are well suited for certain applications. For example, such mixture readily supercools, and in fact is difficult to crystallize, and is, therefore, well suited for use as a hydraulic fluid, especially where low temperatures are encountered. Upon further fractionation, however, essentially pure 4-bromo-3'-chlorodiphenyl ether can be separated.

In addition to powdered iron, other Friedel-Crafts catalysts which can be used in the process of this invention are the chlorides, bromides and iodides of iron, titanium, aluminum, zinc, tin, antimony, magnesium, boron, gallium, indium and zirconium.

While this invention has been described with respect to various specific examples and embodiments, it is understood that the invention is not limited thereto and that it can be variously practiced within the scope of the following claim.

The embodiments of the invention in which an exclusive property or privilege is claimed are defined as follows:

1. The mixture of isomeric bromine- and chlorine-containing diphenyl ethers obtained by the bromination of 3-chlorodiphenyl ether with bromine in the presence of a Friedel-Crafts catalyst.

References Cited

UNITED STATES PATENTS 2,022,634  11/1935  Britton et al. _____ 260—612

BERNARD HELFIN, *Primary Examiner.*